US006962464B1

(12) United States Patent
Chen

(10) Patent No.: US 6,962,464 B1
(45) Date of Patent: Nov. 8, 2005

(54) METHOD FOR CONSTRUCTING A WATER RESOURCE RECYCLING SYSTEM

(76) Inventor: Jui Wen Chen, PO Box 82-114, Taipei (TW)

( * ) Notice: Subject to any disclaimer, the term of this patent is extended or adjusted under 35 U.S.C. 154(b) by 0 days.

(21) Appl. No.: 10/828,214

(22) Filed: Apr. 21, 2004

(51) Int. Cl.$^7$ .......................... E01C 11/22; E02B 13/00
(52) U.S. Cl. ........................ 405/43; 405/36; 405/46; 404/2; 404/36
(58) Field of Search .......................... 405/43, 44, 45, 405/46, 50; 404/2, 3, 35, 36

(56) References Cited

U.S. PATENT DOCUMENTS

| 5,449,246 A | * | 9/1995 | Housley ...................... 404/42 |
| 6,585,449 B2 | * | 7/2003 | Chen ........................... 405/43 |

* cited by examiner

Primary Examiner—Frederick L. Lagman
(74) Attorney, Agent, or Firm—Leong C. Lei

(57) ABSTRACT

An environmental water resource recycling system of the invention comprises pluralities of drainpipes units, which includes pluralities of drainpipes engaged in pluralities of holder holes formed by coupled frame strips, and sealing lids covering the opening at one end of the drainpipes. An instant water-absorbing sand layer is applied on the soil layer exposed on the ground surface before inserting the lower end of the drainpipes held in the drainpipe unit into the sand layer. Concrete is poured onto the ground to be constructed such that the concrete can integrally cover the drainpipe units. The sealing lids can be removed from the openings on the upper end of the drainpipes after the concrete is solidified, thereby accomplishing a permeable paving and instantly draining the rain on the permeable paving to the sand layer and further to the underground for being recycled as water resource for further utilization.

6 Claims, 9 Drawing Sheets

METHOD FOR CONSTRUCTING A WATER RESOURCE RECYCLING SYSTEM

BACKGROUND OF THE INVENTION (a) Technical Field of the Invention

The present invention relates to a method for constructing a water resource recycling system, particularly to a function that can allow water to be instantly drawn downwardly, such that the rain accumulated on the ground can be drawn into the underground through the permeable paving. Accordingly, said paving has the function of absorbing rain into the soil to moisturize the soil for the purposes of regulating the environmental temperature and humidity. In addition, the water drawn into the underground can supplement the underground water resource.

(b) Description of the Prior Art

Generally, a concrete flooring according to the prior art is constructed by pouring a sufficient amount of concrete on the ground, leveling the ground surface and applying brick tiles thereon.

As the paving according to the prior art is constructed by concrete or concrete with bricks, both of which are impermeable and cannot allow water to permeate into the soil thereunder, a great amount of water would accumulate on the ground after a rush of rain, rendering flood disasters easily. Therefore, escape channels are used to lead the accumulated rain to the drainages and subsequently to the sea. Since lone ago, the paving constructed in cities used to be in a close form, such that the soil under the ground is sealed from air and cannot efficiently obtain supplemental water. As the underground water is insufficient, there is harmful to environmental protection. Accordingly, the impermeable paving constructed by concrete is not quite ideal.

As the soil has the function of absorbing water, and can vaporize humidity when contact the air in a dry or hot environment to generate a heat exchange effect, automatically regulate the humidity to avoid the heat island effect.

To permit the rain accumulated on the ground to permeate into the underground smoothly, a permeable paving according to the prior art has been applied. However, the gaps formed by rough pellets do not have good permeability for draining rain and are easily blocked up by miscellaneous materials to further reduce the drainage effect, rendering the work of maintenance harder. Most of all, as the permeable bricks according to the prior art cannot bear hard rain, most of the accumulated rain would be drawn to the sea by way of drainages, rather then by way of the permeable bricks to the underground.

In view of the above, the permeable layer under the ground must be one allowing the underground communicable to the paving surface, such that the soil layer can breath to effectuate heat exchange for regulating humidity and temperature. Besides, the water can be instantly drawn into the underground to avoid water accumulation on the ground.

The water is drawn into the underground by way of an invisible path dug under the ground and is preferably stored as a water resource, in order to supplement the underground water, prevent the danger of stratum sagging, and be further utilized for crop irrigation.

In view of the foregoing, the inventor has researched and development positively to design an improved water resource recycling system, which is in the form of an environmental permeable concrete paving being easily constructed.

SUMMARY OF THE INVENTION

The primary object of the present invention is to provide a water resource recycling system which can allow the rain accumulated on the ground instantly permeate into the soil layer and includes a highly permeable concrete flooring applied to the ground surface, so as to reduce the chances of water accumulation on the ground surface and completely recycle the rain as a water resource.

Another object of the present invention is to provide a water resource recycling system which may draw the water deep into the groundwater stratum to enrich the groundwater content and prevent the groundwater stratum from heat island effect, since when the environment is heated up, the water can be converted into vapor and released through the pipes for regulating the temperature and humidity of the environment.

Yet a further object of the present invention is to provide a water resource recycling system which can allow the rain accumulated on the ground surface into the sand layer under the ground through pluralities of drainpipes, and further permeated into the permeable layer and subsequently to the underground water layer by way of a path deeply dug in the underground. The permeable flooring has the function of absorbing the rain into the soil for supplement the underground water resource for environmental purposes.

A further object of the invention is to provide a method of constructing a permeable paving in an easy, time-efficient and economic way.

For the above purposes, the water resource recycling system according to the present invention includes pluralities of drainpipes engaged in pluralities of holder holes formed by coupled frame strips, and sealing lids covering the opening at one end of the drainpipes. An instant water-absorbing sand layer is applied on the soil layer exposed on the ground surface before inserting the lower end of the drainpipes held in the drainpipe unit into the sand layer. Concrete is poured onto the ground to integrally cover the drainpipe units. The sealing lids can be removed from the openings on the upper end of the drainpipes after the concrete is solidified, thereby accomplishing a permeable paving and instantly draining the rain on the permeable paving to the sand layer and further to the underground for being recycled as water resource for further utilization.

Meanwhile, a path can be deeply dug under the macadam layer to reach the underground water layer deep inside of the underground, so as to lead the water down to supplement the underground water resource and prevent from drought.

The detailed construction and other characteristics of the present invention can be better understood by way of reading the following descriptions with reference to the accompanied drawings. The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention relates to a method for constructing a water resource recycling system, which not only can efficiently improve the technique of applying permeable bricks to form a permeable paving according to the prior, but also can improve the method of construction to be more time-efficient and economic. Meanwhile, the permeable paving constructed according to the invention can be more endurable. In view of the characteristics of instant water permeation, the invention can allow water permeate into the underground and be recycled completed for further utilization, such as supplementing the underground water resource, without wastefully flowing into the sea.

The water resource recycling system according to the invention includes paving on the ground and the path dug deeply in the underground depending the stratum structure, and/or water reservoir(s) provided in the soil stratum for recycling water. The rain recycled can instantly permeate into the underground and be taken out from the water reservoir(s) under the ground, if necessary, by way of pipes. And most of the rain would be drawn deep into the underground water layer for supplementation purposes.

Figure 1:
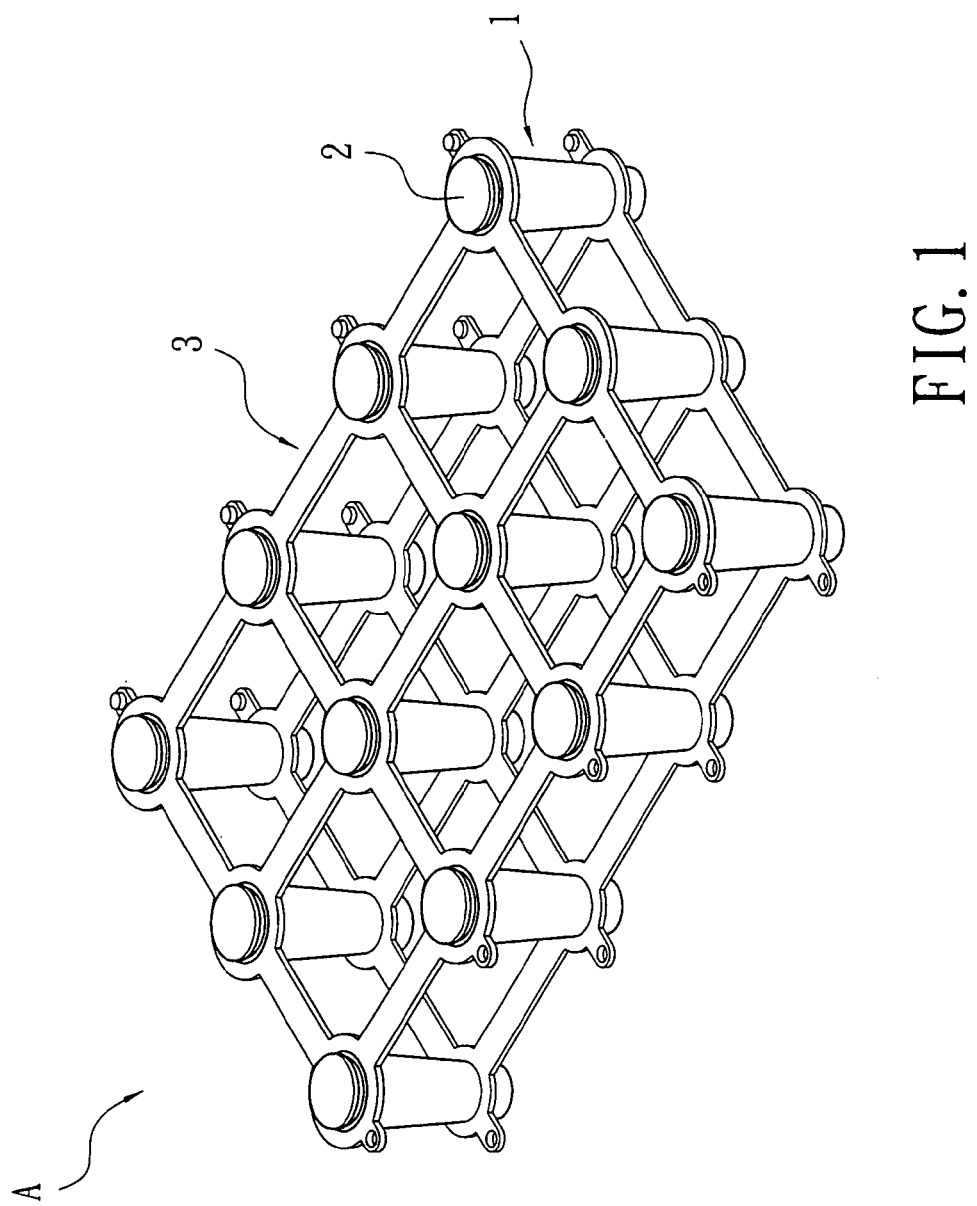
FIG. 1 is a perspective view of the drainpipe unit according to the invention.
Figure 2:
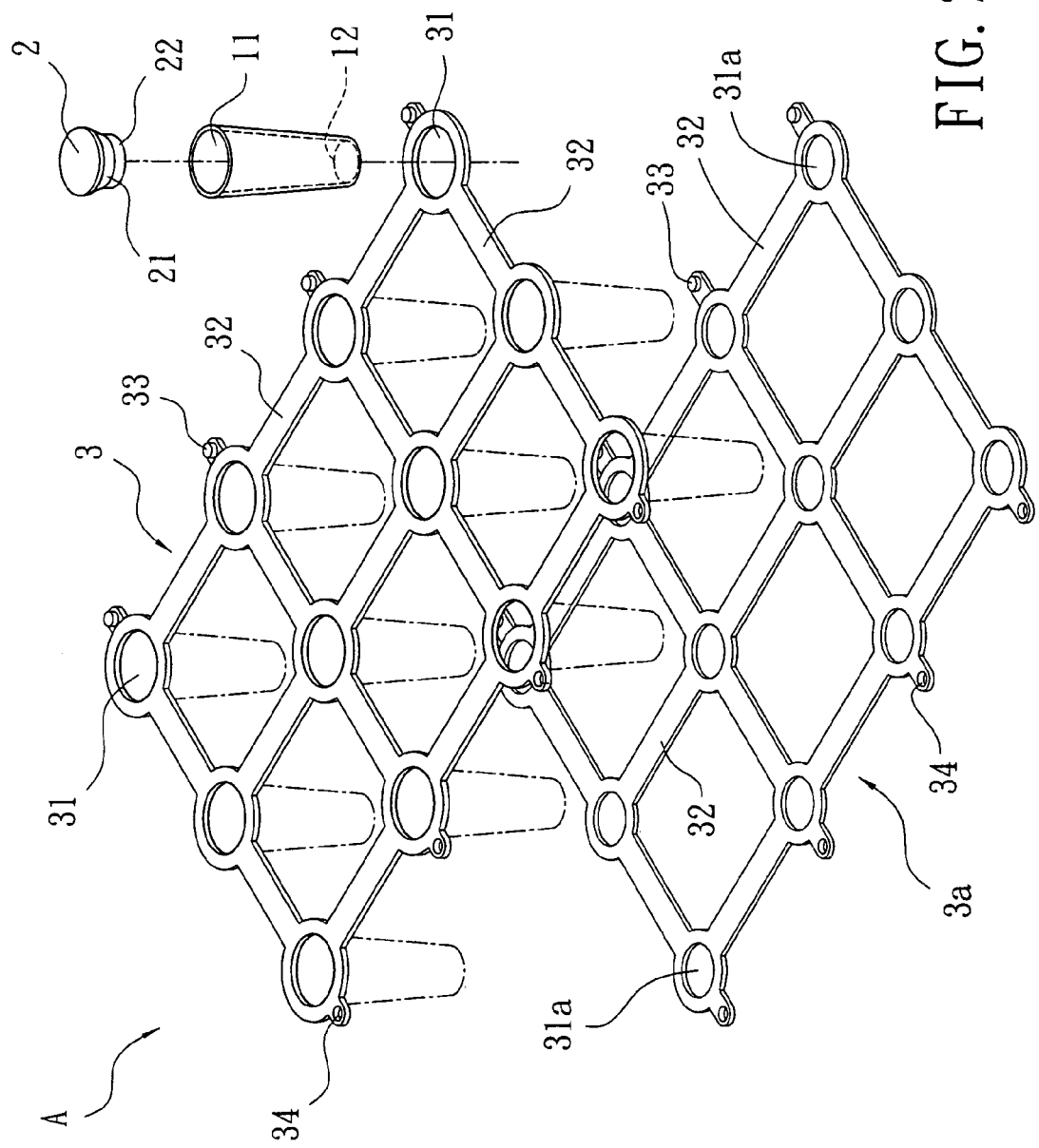
FIG. 2 is an exploded view of the drainpipe unit according to the invention.
Figure 5:
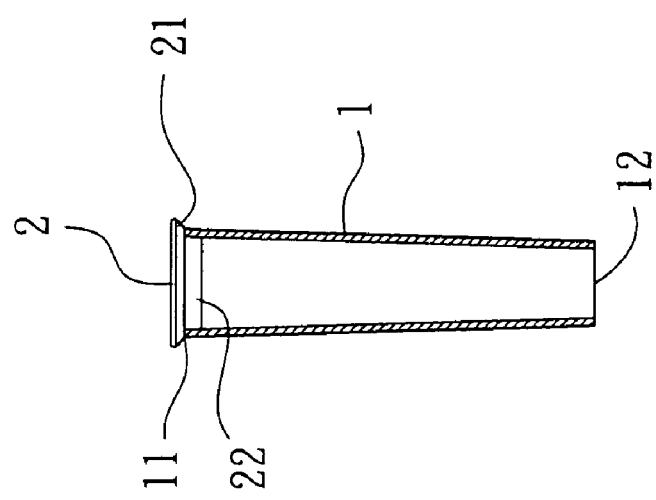
FIG. 5 shows the drainpipe and the sealing lid in coupling status.

Referring to FIGS. 1 and 2, the permeable paving constructed according to the invention includes drainpipe units A, each comprising pluralities of drainpipes 1, sealing lids 2 and a connecting frame 3. Each drainpipe 1 has communicating openings 11 and 12 at two ends (as shown in FIG. 2) such that the drainpipe is in form of a hollow cylinder. The sealing lid 2 in the form of a plug is provided on the opening 11 on the top of the drainpipe 1. The sealing lid 2 is provided with a wedge 21 at the upper rim, and a step 22 extruding from the center portion, such that the sealing lid 2 can seal the opening 11 of the drainpipe 1 to prevent from detaching at the time of construction (as shown in FIGS. 2 and 5).

Figure 3:
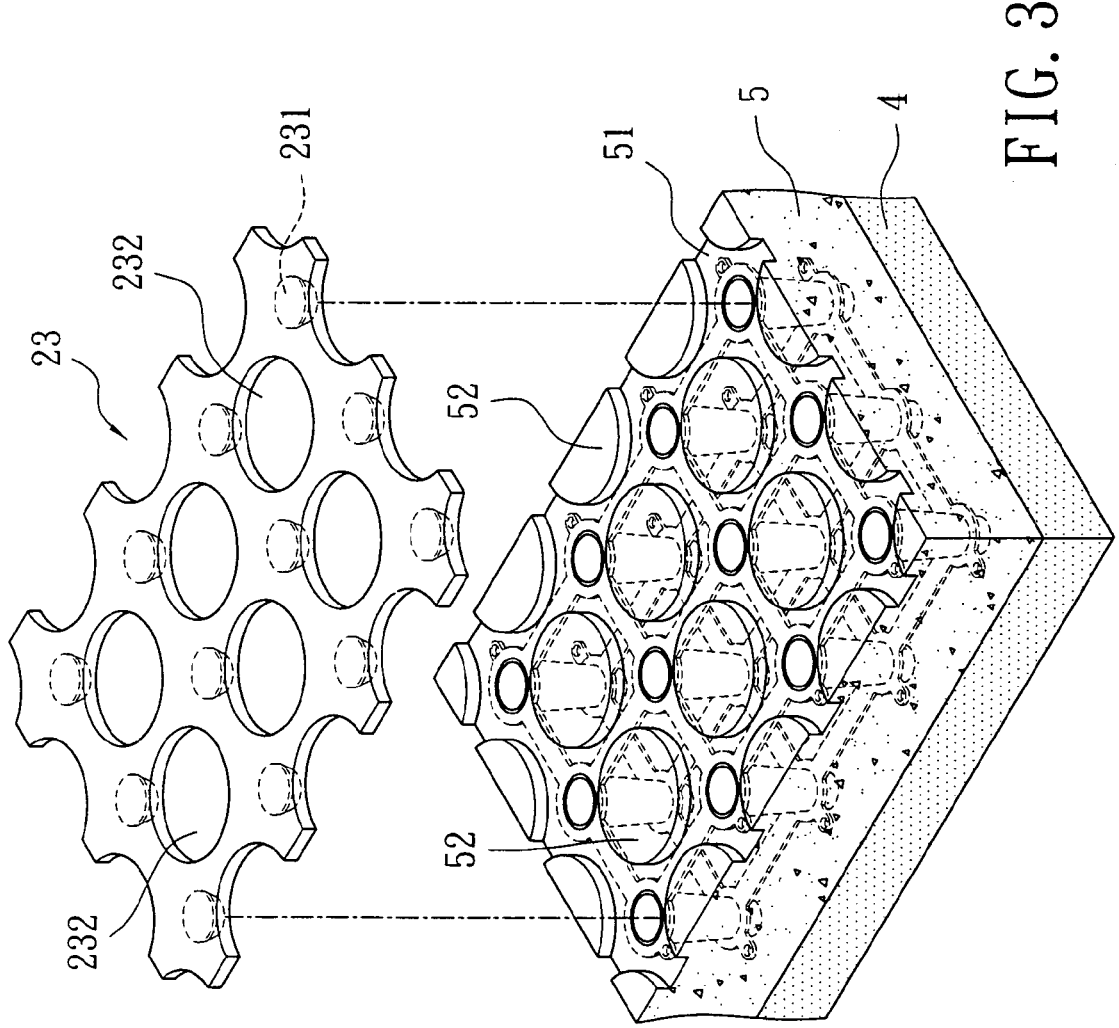
FIG. 3 shows paving the moldboard according to the invention.

Referring to FIG. 3, the sealing lid 2 may be combined on the bottom of a moldboard 23, which is formed integrally with plugs 231 and hollowed pattern 232, such that the plugs 231 can be removed along with the moldboard 23 from the openings 11 of the drainpipes 1, rather then being detached one by one, so as to easy and speed up the construction. Besides, the hollowed patterns 232 can form brick patterns 52 on the paving surface after completion of the construction to present a beautiful view and prevent pedestrians from slip.

As shown in FIG. 2, the connecting frames 3(3a) of the drainpipe unit A are provided with holder holes 31(31a) for engagement of the drainpipes 1. Besides, connection portions 32 in the form of strip are provided at the sides of the holder holes 31(31a), such that the pluralities of holder holes 31(31a) can combine with the drainpipes 1 to form a drainpipe unit A. Besides, the connecting frames 3(3a) can serve as a resistant face for the workers to stand thereon at the time of construction for inserting the drainpipes 1 into the sand layer, without the risk of sagging into the soil.

In one preferred embodiment, the connecting frames 3, 3a can be provided with extrusions 33 at the side, while apertures 34 can be provided at the corresponding connecting frames 3, 3a, thereby the extrusions 33 at each connecting frame 3(3a) can be coupled to the apertures 34 at the adjacent connecting frame 3(3a) to form a great area of desired size and shape, enhancing the utilities and application of the invention.

Figure 4:
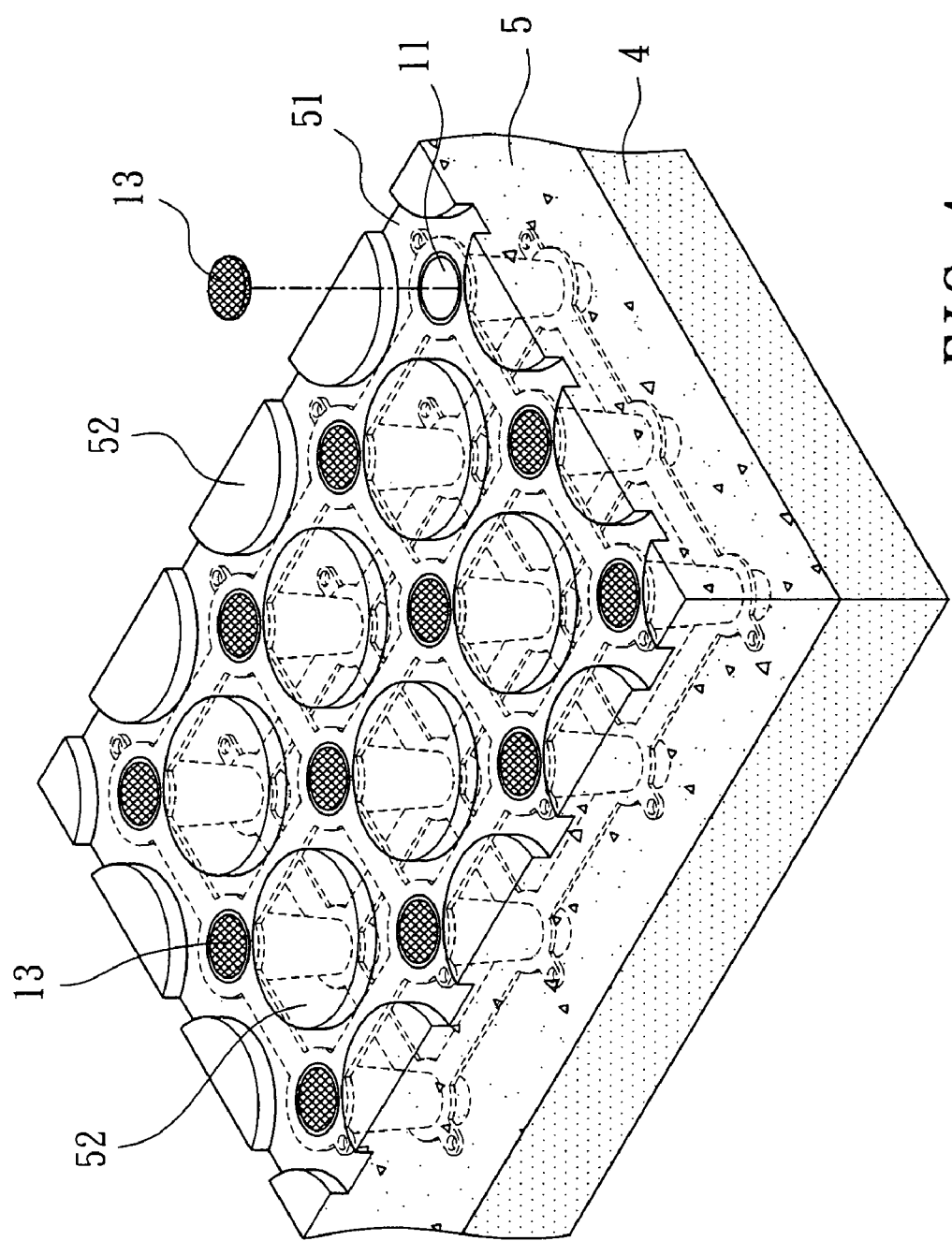
FIG. 4 shows installing the mesh according to the invention.
Figure 6:
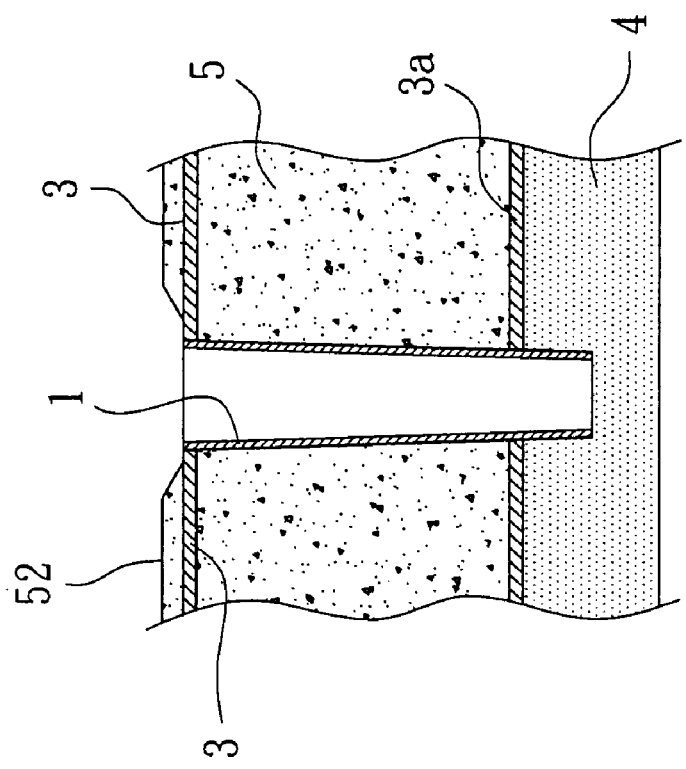
FIG. 6 is a cut-away view of the constructed flooring according to the invention.

In construction of the water resource recycling system according to the invention, the holder holes 31, 31a on the upper and lower connecting frames 3, 3a are mounted on the ends of the pluralities of drainpipes 1 to permit the drainpipes stand vertically without toppling over to have undesired materials stuck at the opening 12 at the lower end. A sealing lid 2 is provided at the opening 11 at the top of the drainpipe 1. After leveling the macadam stratum (containing macadam, sand and soil), a layer of sand 4 can be applied thereon. The combined drainpipe unit A is pressed down onto the sand layer with the lower connecting frames placed above the sand in support, so that the workers can stand on the drainpipe units A without sagging into the soil. The opening 12 at the lower end of the drainpipe 1 is engaged into the sand layer 4 such that the poured concrete would block it. The liquid concrete 5 is poured onto the drainpipe units A and the sealing lids 2 on the top of the drainpipes 1 are removed after the concrete is solidified (as shown in FIG. 6). Furthermore, to prevent the female pedestrians' high heels from sagging into the openings 11 of a greater diameter, a mesh 13 (as shown in FIG. 4) can be mounted on each opening 11 at the top of the drainpipe 1. The mesh 13 can serve as a filter to prevent the drainpipe 1 from being blocked.

Figure 7:
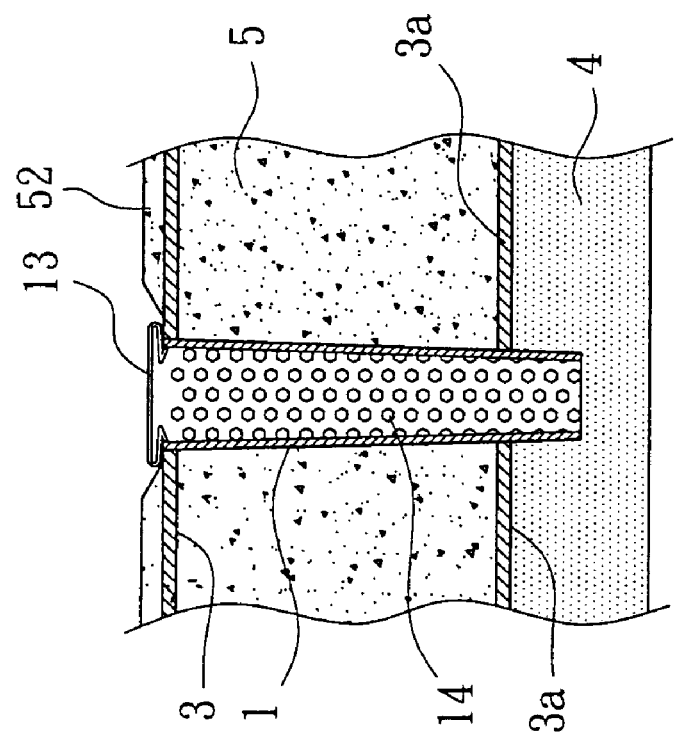
FIG. 7 is a cut-away view of the constructed flooring according to the invention, showing adding pebbles into the drainpipe.

Referring to FIG. 7, the invention can be additionally provided with pebbles 14 in the drainpipes 1 to prevent the hollow portion thereof from being blocked by trash, leaves, etc., and to ease the cleaning job, in order to smooth water permeation. Besides, as the concrete 5 has formed a layer structure, pattern moldboards 23 can be applied to form the paving (as shown in FIGS. 3 and 4). While the moldboard 23 can match each other to form brick patterns or arrange any pattern desired, the drainpipes 1 are installed in-between the gapes without affecting the view. And the hollowed gapes can form water leading grooves 51 to further enhance the function of water drawing.

After completing the construction of the concrete 5 paving and detaching the sealing lids 2, the openings 11 at the top of the drainpipes 1 would expose out of the paving with the pipes stay through the concrete 5, the end of the pipes reaching the sand layer 4 (as shown in FIG. 6). The rain can permeate through the path inside of the hollow pipe 1 to the sand layer 4, which has excellent permeation and can allow the rain instantly permeate downwardly. As such, the rain would not accumulate on the ground surface or in the drainpipe, proving that the paving constructed according to the invention has the function of instant permeation. After paving the sand layer 4 and leveling the sand by engineering vehicles or mechanism, the drainpipe units A can be applied onto the ground to ease the construction. Besides, as the concrete 5 is in form of an integral layer, the paving surface should have certain firmness and beautiful view.

Figure 8:
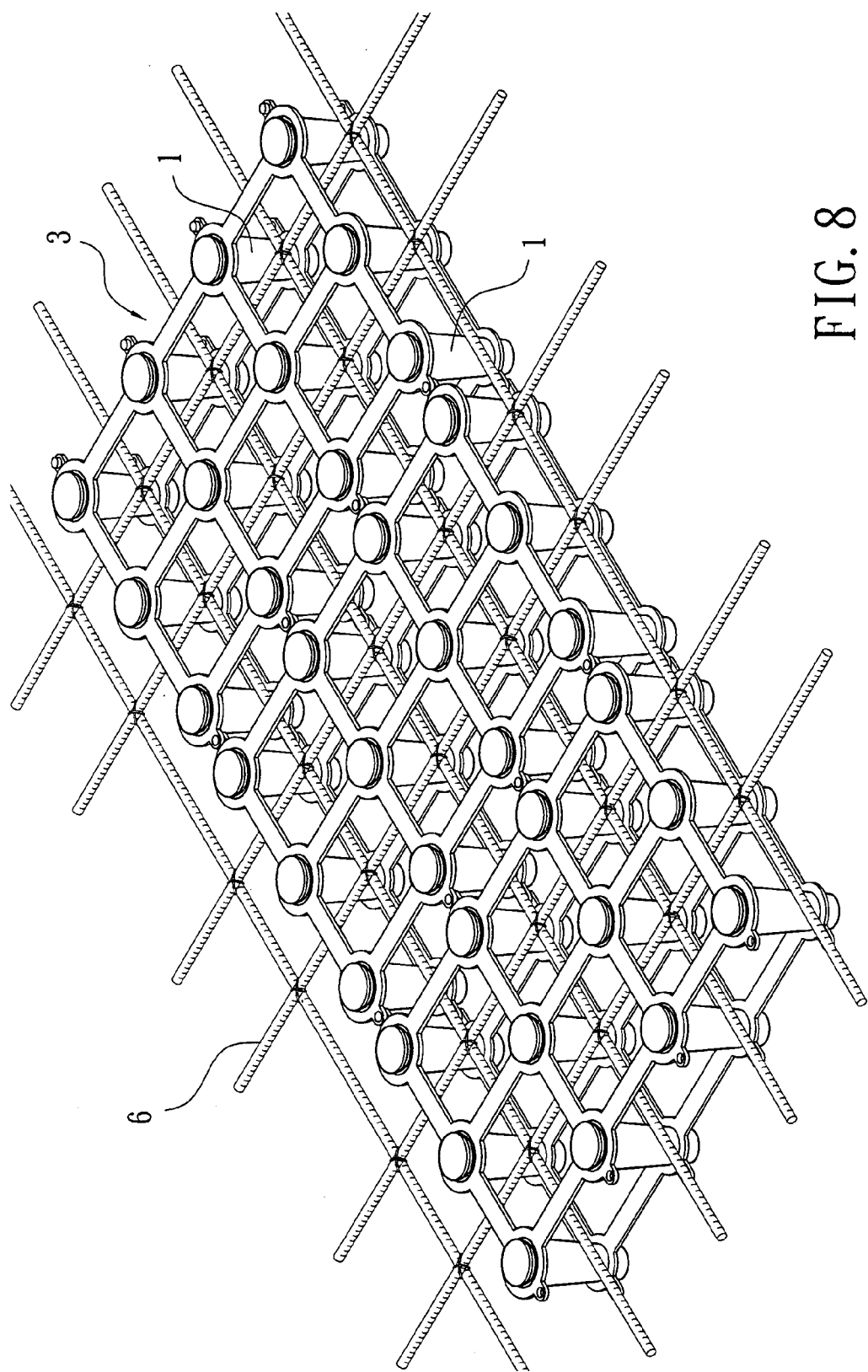
FIG. 8 is a perspective view of another preferred embodiment of the invention, showing addition of reinforcing bars to the drainpipe units.

After the drainpipes A are applied onto the sand layer 4, reinforcing bars 6 (as shown in FIG. 8) can be additionally installed into the space in-between the upper and lower connecting frames 3, 3a. And then the concrete 5 is poured thereonto. Alternatively, permeable pitch can be applied on the concrete 5 to form a permeable paving. In fact, the upper and lower connecting frames 3, 3a can bear certain pressure and thus serve the connection purpose after the concrete is solidified.

Figure 9:
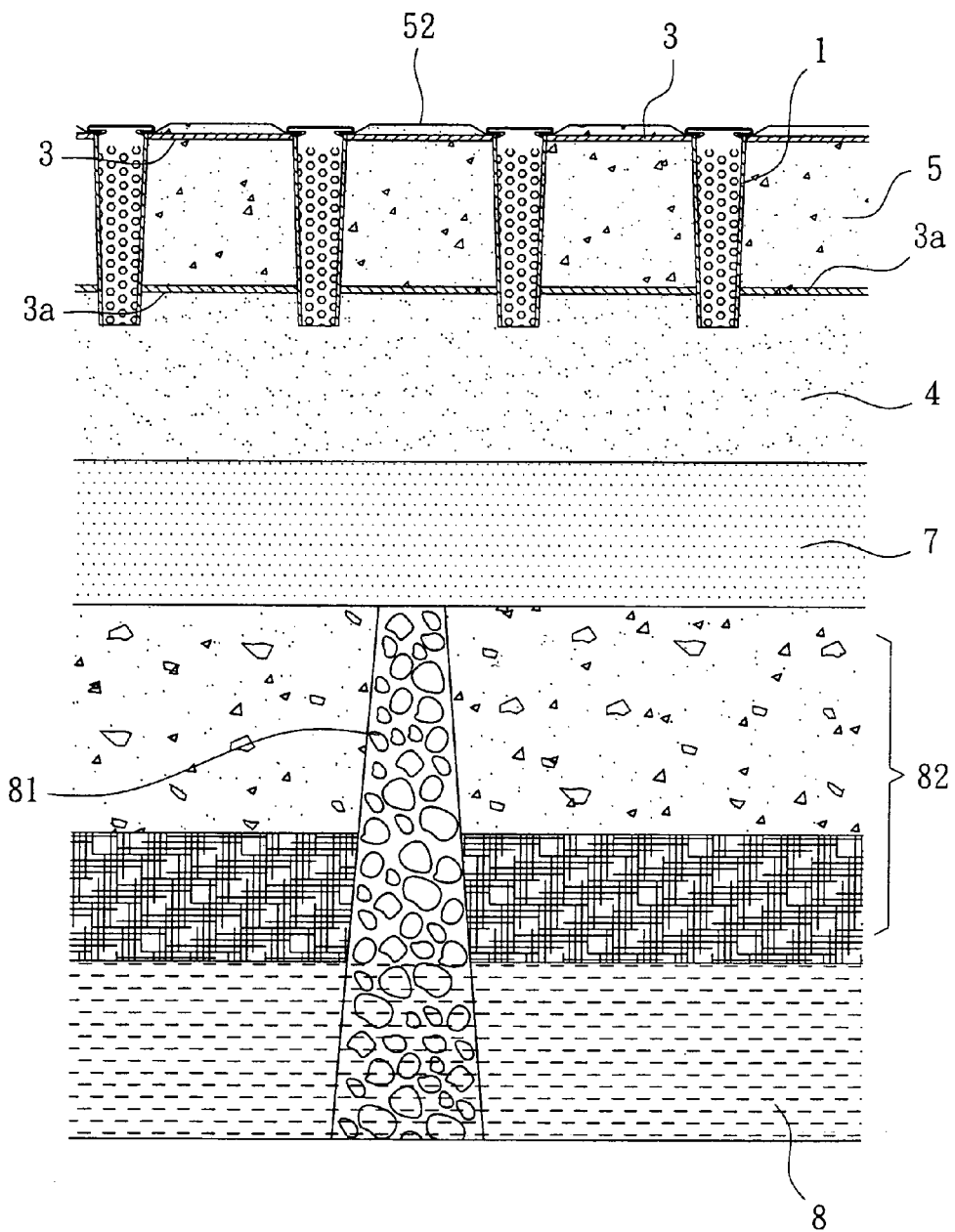
FIG. 9 is a cut-away view of another preferred embodiment of the invention.

Referring to FIG. 9, a path 81 can be deeply dug deep through to the underground 82 right above the underground water stratum 8 before applying the macadam stratum 7 and then the sand layer 4. The drainpipe units A are installed as explained above and form a permeable paving after the poured concrete 5 has solidified, thereby the utilities of the invention is even broader.

Figure 10:
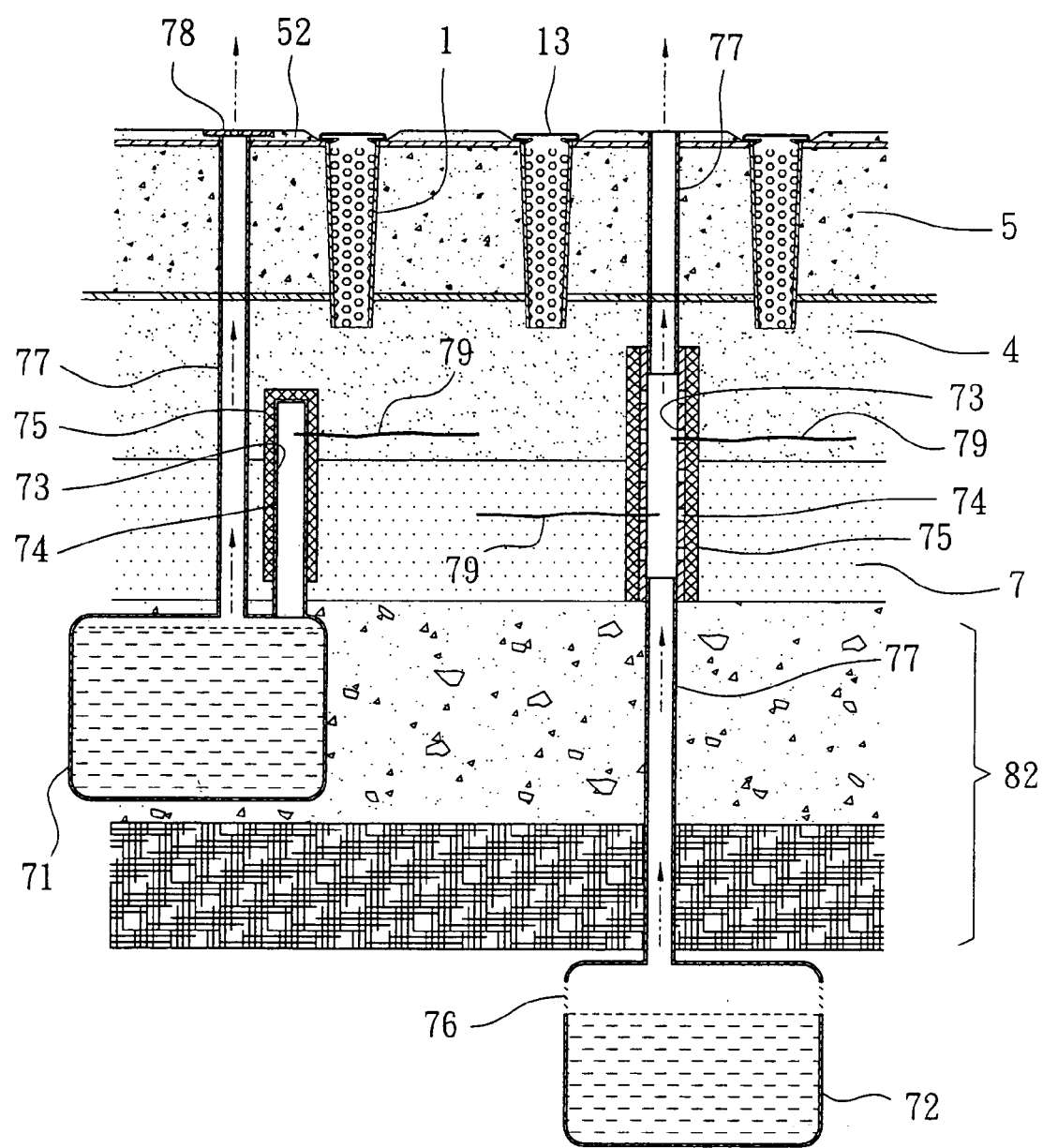
FIG. 10 is a cut-away view of another preferred embodiment of the invention.

Referring to FIG. 10 which shows another preferred embodiment of the invention, a water reservoir 71 can be pre-buried in the macadam stratum 7 for storing water resource. Alternatively, in some areas where there are no such an underground layer 8, a deep level water reservoir 72 can be provided. Water intake pipes 73 can be connected to the upper level portion of each water reservoir (71, 72). While water intakes 74 are provided on the surrounding of the water intake pipes 73 for leading the water into the water intakes 74, the outer portion of the water intake 74 is covered by a sand filtering element 75, such that the water in the macadam stratum 7 can be drawn into the water reservoirs (71, 72).

Besides, an overflow 76 can be provided above the deep level water reservoir 72, so that the up surging water level in the deep level water reservoir 72 can easily flow to the underground for supplementation of the underground water resource.

As shown in FIG. 10, a water-drawing pipe 77 connected to the ground surface can be provided on the top of the water reservoir 71 or deep level water reservoir 72. The top of the water-drawing pipe 77 would expose on the ground and is sealed by a cover 78. When in drought, the stored water can be drawn out of the water reservoirs (71, 72) for road washing, plant irrigation, fire distinguishing, etc. to reduce the water consumption from the great reservoirs.

Furthermore, in order to enhance water entering into the water reservoirs (71, 72), drainage belts 79 can be further installed in the macadam stratum 7 with the end of the drainage belts 70 inserted into the water intakes 74 of the water intake pipes 73. When the soil is full of water, the water can be instantly drawn into the water reservoirs (71, 72) as well.

In view of the above, the present invention, after completing the construction, can achieve the following advantages:

1. The construction of the environmental permeable flooring is very time-and-cost efficient.

2. The drainpipe units when combined with concrete can be used as positioning units as firm as reinforcing bars, and can be additionally provided with reinforcing bars for bearing higher pressure. The permeable paving constructed according to the invention would be very endurable.

3. The water accumulated on the ground can be quickly drawn into the underground by the highly permeable flooring and further absorbed by the macadam base to enhance the water content of the soil and prevent heat island effect.

4. The integral water resource recycling system can be constructed in a populous place, for example, a great community, the public, a metropolis, etc., so that the preserved water can be utilized in case of draught and for road washing, plant irrigation, fire distinguishing, etc. to reduce water consumption from the great reservoirs.

5. The integral water resource recycling system can allow the rain be drawn into the underground to supplement the groundwater content without wasting and prevent the groundwater from drying up and, in turn, the stratum from sagging.

Concluded above, the present invention discloses a water resource recycling system comprising pluralities of drainpipes units, which includes pluralities of drainpipes engaged in pluralities of holder holes formed by coupled frame strips, and sealing lids covering the opening at one end of the drainpipes. An instant water-absorbing sand layer is applied on the soil layer exposed on the ground surface before inserting the lower end of the drainpipes held in the drainpipe unit into the sand layer. Concrete is poured onto the ground to be constructed such that the concrete can integrally cover the drainpipe units. The sealing lids can be removed from the openings on the upper end of the drainpipes after the concrete is solidified, thereby accomplishing a permeable paving and instantly draining the rain on the permeable paving to the sand layer and further to the underground for being recycled as water resource for further utilization. As the invention can not only simplify the construction of an environmental permeable paving, but also enhance the utilities of the paving.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method for constructing a water resource recycling system, primarily characterized in a permeable paving constructed on the ground; the paving comprises drainpipe units integrally formed with concrete; the method thereof including the following steps:

(a) connecting the pluralities of drainpipe units with each other, each drainpipe unit being composed of pluralities of drainpipes and at least one connecting frame strip; each drainpipe is provided with a sealing lid on the opening at the upper end; and the pluralities of drainpipe units can be connected to form an area or shape as desired;

(b) installing the pluralities of drainpipe units into the ground after the ground has been leveled and the soil has been exposed, with the drainpipes inserted into the soil;

(c) pouring concrete onto the ground to be constructed such that the concrete can cover the drainpipe units, in order to accomplish the permeable paving; and (d) removing the sealing lids from the openings on the upper end of the drainpipes after the concrete is solidified;

thereby the rain on the permeable paving can be instantly drained to the underground through the hollow drainpipes and recycled as water resource for further utilization;

wherein the drainpipe units mentioned in step (a) are connected to each other;

holder holes and connecting bands are provided on the connecting frames, while extrusions and apertures are provided at two sides of each drainpipe unit, thereby the extrusions can be combined with the holder holes to form a great area.

2. The method for constructing a water resource recycling system according to claim 1, wherein the sealing lids mentioned in step (c) can be formed integrally on the bottom of a mold, such that when proceeding step (c) for removing the sealing lids, the sealing lids can be simply detached along with the mold.

3. The method for constructing a water resource recycling system according to claim 2, wherein the sealing lids can be integrally formed on a mold, which, comprising plugs and hollowed pattern, can be combined with the openings on the upper end of the pipes.

4. The method for constructing a water resource recycling system according to claim 1, wherein when proceeding step (b) for paving the ground, a water reservoir can be pre-buried in the macadam layer and is connected with the ground surface by water drawing pipes.

5. The method for constructing a water resource recycling system according to claim 1, wherein when proceeding step (b) for paving the ground, a deep level water reservoir can be pre-buried in the macadam layer and can be provided with a overflow at the top for purposes of storing water, as well as supplementing underground water.

6. The method for constructing a water resource recycling system according to claim 4, wherein a water intake pipes can be connected to the water reservoir at the upper level; each water intake pipe can be provided with water intakes at the periphery for connecting to a drain belt, while sand filtering element can be provided outside of the intakes for leading water.

* * * * *